(12) United States Patent
Irmscher et al.

(10) Patent No.: US 7,295,104 B2
(45) Date of Patent: Nov. 13, 2007

(54) LIGHTING APPARATUS

(75) Inventors: Tobias Irmscher, Lippstadt (DE); Martin Kempkensteffen, Lippstadt (DE); Franz-Josef Kalze, Harsewinkel (DE)

(73) Assignee: Hella KGAA Hueck & Co., Lippstadt (DE)

( * ) Notice: Subject to any disclaimer, the term of this patent is extended or adjusted under 35 U.S.C. 154(b) by 196 days.

(21) Appl. No.: 11/121,921

(22) Filed: May 5, 2005

(65) Prior Publication Data

US 2005/0248953 A1  Nov. 10, 2005

(30) Foreign Application Priority Data

May 5, 2004 (DE) .................. 10 2004 022 168

(51) Int. Cl.
*B60Q 1/26* (2006.01)

(52) U.S. Cl. .................. 340/468; 340/815.45; 362/308

(58) Field of Classification Search .............. 340/468, 340/435, 436, 466, 815.45; 250/504 R; 362/308, 362/459, 306

See application file for complete search history.

(56) References Cited

U.S. PATENT DOCUMENTS

| 5,448,453 A | * | 9/1995 | Oshio | 362/510 |
| 5,854,537 A | * | 12/1998 | Gotoh et al. | 315/82 |
| 6,897,459 B2 | * | 5/2005 | Albou | 250/504 R |

FOREIGN PATENT DOCUMENTS

| DE | 39 32 216 A1 | 4/1991 |
| EP | 0 479 634 A1 | 4/1992 |
| EP | 1 139 011 A1 | 10/2001 |

* cited by examiner

*Primary Examiner*—Phung T. Nguyen
(74) *Attorney, Agent, or Firm*—Birch, Stewart, Kolasch & Birch, LLP

(57) ABSTRACT

A lighting apparatus for vehicles having two primary headlights for visible low beam and high beam illumination, and auxiliary headlights that are mounted on the vehicle separate from the primary headlights. The auxiliary headlights generate infrared light and position light. An electrical control unit automatically turns the position light of the primary headlights off or on when the auxiliary headlight is turned on or off.

12 Claims, 1 Drawing Sheet

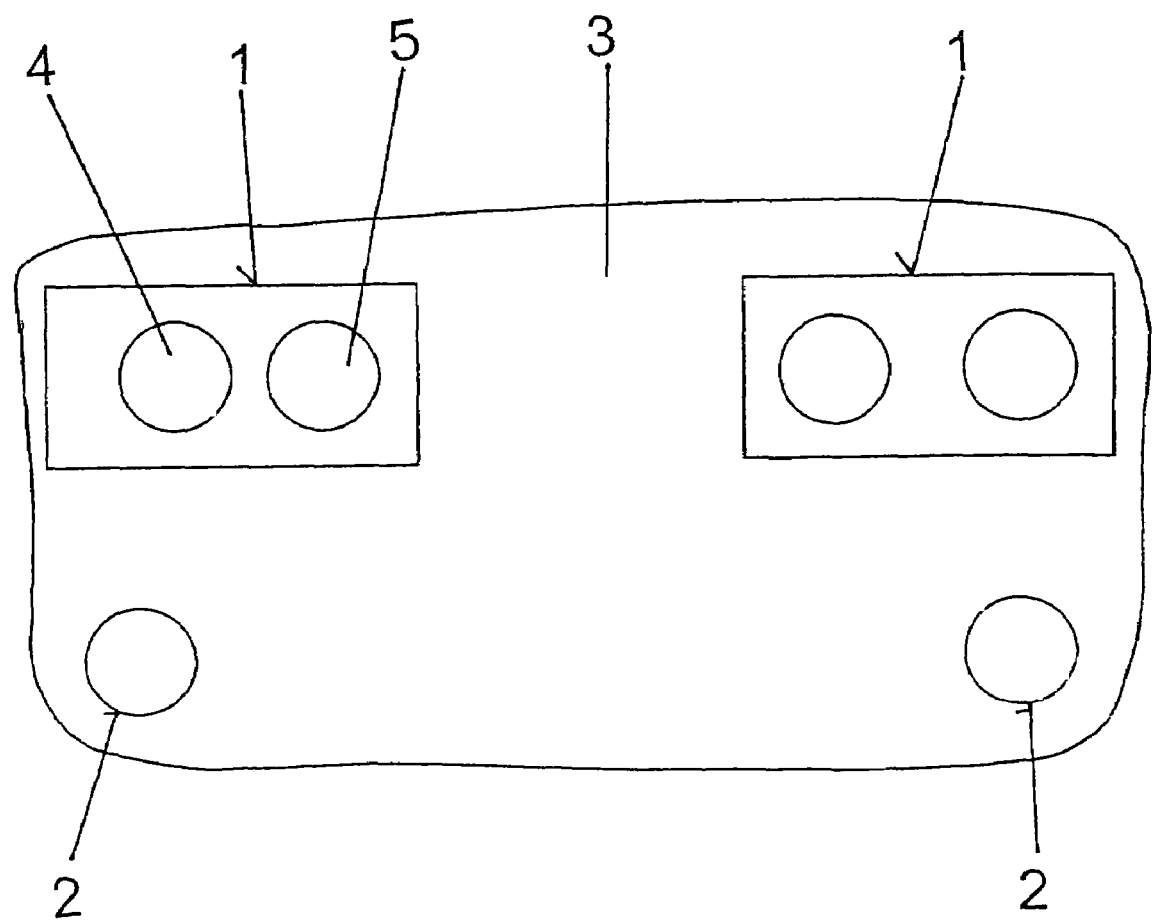

LIGHTING APPARATUS

This nonprovisional application claims priority under 35 U.S.C. § 119(a) on German Patent Application No. de 102004022168, which was filed in Germany on May 5, 2004, and which is herein incorporated by reference.

BACKGROUND OF THE INVENTION

1. Field of the Invention

The present invention is directed to a lighting apparatus for vehicles having two primary headlights for visible low beam and high beam illumination and a light function for infrared light.

2. Description of the Background Art

Motor vehicles are equipped in a known fashion with lighting systems for generating low and high beam illumination. With the high beam lights turned on, an extended visual range is illuminated for the driver of the vehicle; however, the high beams have to be switched off for oncoming traffic to avoid blinding the driver of the oncoming vehicle. The now engaged low beam lights illuminate a substantially smaller visual range for the driver so that possible obstacles in the roadway are illuminated too late for the motorist to detect. A remedy is found with a conventional headlamp device for vehicles according to EP-B-0 479 634. Behind a shared lens, the headlamp has a reflector for the visible low beam light and a reflector for visible and infrared high beam light. A rotatable infrared-filter makes it possible to switch between visible and infrared high beam light. An infrared camera attached to the vehicle captures the area that is illuminated by the infrared light bundle to be displayed on a display screen mounted within the visual field of the driver of the vehicle. Thus, even with the low beam lights turned on, the driver of the vehicle can detect obstacles early on the display screen without blinding the driver of an oncoming vehicle. In order to reduce the undesirable red light image of the IR high beam headlight, that is, to receive the image of a white light, visible light can bypass the filter (EP-A-1 139 011).

From DE-C-39 32 216 a lighting device for vehicles is known, whereby the primary headlights include two light modules each, respectively being arranged in an opening in the body of the vehicle. It is common with lighting devices such as these that the two light modules of the primary headlights respectively share a mutual headlamp carrier. A light module of the primary headlights generates the visible low beam light, whereas the other light module has a slidable IR-filter, which allows switching to infrared, that is, visible high beam light.

The disadvantage of the two lighting devices for vehicles according to EP-B-0 479 634 and DE-C-39 32 216 is that the primary headlights can only be used with lighting devices that have infrared light.

SUMMARY OF THE INVENTION

It is therefore an object of the present invention to provide a lighting device such that primary headlights can be used regardless of whether the lighting systems have an infrared light function or not.

To meet this objective, the invention, provides that a light function for infrared light can be controlled by auxiliary headlights that are mountable to the vehicle separate from the primary headlights, whereby, in addition to the infrared light, a visible position light is generated when the auxiliary headlights are turned on. Also provided is an electrical control unit, which automatically can turn the position light of the primary headlights on or off, when the auxiliary headlights are turned on or off.

Thus, out of four position lights, only two are operating when the infrared light, that is, the auxiliary headlights, are turned on. This is beneficial, because by law, only two position lights can be switched on at any time. Furthermore, due to the white position light, the red light image caused by the infrared light of the auxiliary lights is diminished such that only white position light is visible thus staying within the rules of the law.

The control unit, in dependence from at least one parameter, can switch between the light function of the auxiliary headlights comprised of infrared and position lights, and a light function for visible position lights of the primary headlights is automatic. In this context, it is beneficial for the changeover switching of the control unit to be dependent on the speed of the vehicle, and that the speed is between 0 km/h and 70 km/h, preferably between 20 km/h and 50 km/h.

According to an example embodiment of the invention, the auxiliary headlights for infrared long-range illumination are mountable on the vehicle separate from a carrier of the primary headlight. In this way, the vehicle can be equipped at a later time with an auxiliary headlight that generates infrared light.

In a further embodiment of the invention, the primary headlights are provided with a gas-discharge lamp for long-range illumination, whereby the auxiliary headlights are equipped with a halogen lamp and can be switched between infrared and visible high beam light via an adjustable infrared filter. The auxiliary headlights are hereby usable for a long distance headlight flasher because a halogen lamp provides long-range light faster than a gas-discharge lamp.

In another embodiment of the invention, the primary headlights include a gas-discharge lamp for long distance illumination, whereby the auxiliary headlights have LEDs for infrared light and LEDs for visible light. The auxiliary headlights can hereby also be used as long distance headlight flashers. The white and infrared LEDs can be randomly arranged on a carrier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the single FIGURE shows a cross-section of a front of a vehicle having a lighting apparatus for vehicles comprised of two primary headlights for low beam light each including a first position light and two separate auxiliary headlights for infrared light with a respective second position light.

DETAILED DESCRIPTION

The FIGURE illustrates a front section of a vehicle 3, in which two primary headlights 1 and two auxiliary headlights 2 are installed. The primary headlights have a light module 4 for low beam light and a first position light and a light module 5 for high beam light. In a clearance below the primary headlights 1, the auxiliary headlights 2 are arranged. The auxiliary headlights 2 generate infrared high beam light and a second position light. A halogen lamp with assigned infrared filters is used to generate infrared high beam light, or LEDs to generate infrared light and LEDs to generate white PO light. When the infrared high beam function and the second position light function of the auxiliary headlights 2 are switched on, an electrical control unit (not shown) turns off the first position light of the primary headlight 1. When the auxiliary headlights 2 are turned off, the electrical control unit automatically turns the first position light of the primary headlight 1 back on. With the electrical control unit, automatic changeover switching between the auxiliary headlights 2 and the position light of the primary headlights 1 can be achieved. The changeover switching is triggered by speed. The changeover switching in both directions takes place at a speed of between 0 km/h and 70 km/h, preferably at 40 km/h.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for a vehicle, the lighting apparatus comprising:
    a primary headlight for providing visible low beam and high beam illumination and a light function for providing infrared light;
    an auxiliary headlight, which can be mounted to the vehicle separate from the primary headlight, the auxiliary headlight generating visible position light and infrared light; and
    an electrical control unit, which automatically turns the light of the primary headlight on or off on the basis of when the auxiliary headlight is turned on or off,
    wherein the control unit switches between the auxiliary headlight and the primary headlight automatically such that only the primary headlight or the auxiliary headlight is turned on.

2. The lighting apparatus according to claim 1, wherein, via the control unit, on the basis of at least one parameter, switching between a light function of the auxiliary headlight and a light function of the primary headlight is automatic.

3. The lighting apparatus according to claim 2, wherein the switching by the control unit is dependent on the speed of the vehicle.

4. The lighting apparatus according to claim 3, wherein the switching occurs at a speed of between 0 km/h and 70 km/h.

5. The lighting apparatus according to claim 1, wherein the auxiliary headlight for infrared long-range illumination is mountable to the vehicle separate from a carrier of the primary headlight.

6. The lighting apparatus according to claim 1, wherein the primary headlight includes a gas-discharge lamp for long distance illumination, and wherein the auxiliary headlight can be switched between infrared and visible high beam light by an adjustable infrared filter.

7. The lighting apparatus according to claim 1, wherein the primary headlight include a gas-discharge lamp for long distance illumination, and wherein the auxiliary headlight is provided with LEDs for infrared light and LEDs for visible light.

8. The lighting apparatus according to claim 1, wherein the vehicle has two primary headlights.

9. A lighting apparatus for a vehicle, the lighting apparatus comprising:
    a primary headlight for providing visible low beam and high beam illumination and a light function for providing infrared light;
    an auxiliary headlight, which can be mounted to the vehicle separate from the primary headlight, the auxiliary headlight generating visible position light and infrared light; and
    an electrical control unit, which automatically turns the light of the primary headlight on or off on the basis of when the auxiliary headlight is turned on or off,
    wherein the control unit, on the basis of at least one parameter, automatically switches between a light function of the auxiliary headlight and a light function of the primary headlight,
    wherein the switching by the control unit is dependent on a speed of the vehicle, and
    wherein the switching occurs at a speed of between 20 km/h and 50 km/h.

10. A method for controlling a vehicle lighting apparatus, the method comprising:
    determining a speed of the vehicle; and
    switching between a primary headlight and an auxiliary headlight on the basis of the speed of the vehicle,
    wherein the primary headlight generates visible white light, and
    wherein the auxiliary headlight generates visible white light and infrared light, and
    wherein a control unit switches between the auxiliary headlight and the primary headlight automatically such that only the primary headlight or the auxiliary headlight is turned on.

11. The method according to claim 10, wherein the control unit switches between the auxiliary headlight and the primary headlight automatically on the basis of the speed of the vehicle.

12. The method according to claim 10, wherein the primary headlight generates infrared light in addition to the visible white light.

* * * * *